Patented July 31, 1945

2,380,696

UNITED STATES PATENT OFFICE 2,380,696

METHOD OF STERILIZING

Lawrence H. James, Silver Spring, Md.

No Drawing. Application January 20, 1943,
Serial No. 473,003

8 Claims. (Cl. 21—56)

This invention relates to a method of sterilizing and more particularly to an improved method of killing micro-organisms such as bacteria, yeasts, fungi, and their spores, and in some cases destroying toxic by-products of growth of such micro-organisms without damage to the materials being sterilized.

In the sterilization of fabrics or fibrous materials such as those employed for bandages or other medical or surgical uses, as well as clothes, food containers and the like, it has been the general practice to heat the objects or materials being sterilized to high temperatures for relatively long periods of time either in air or by direct contact with steam under pressure. Effective sterilization requires not only the killing of the micro-organisms themselves but also their spores, the spores being, in general, much more difficult to kill than the vegetative micro-organisms. With some micro-organisms it is also necessary to destroy toxic by-products formed during growth. Many of the materials required to be sterilized cannot, however, withstand the sterilizing conditions necessary with prior processes for the period of time required to destroy the organisms or their spores or by-products.

The sterilization methods of the prior art have been usually either of the so-called dry heat type or of the steam pressure type. Dry heat sterilization involves long exposure of the materials in air to high temperatures and is generally slower than steam pressure sterilization. Thus, many products cannot withstand the temperatures and exposure required for such dry heat sterilization. While steam pressure sterilization is more rapid, it involves heating the materials to high temperatures with steam under pressure with consequent condensation of moisture and exposure of the materials to wet steam so that many materials also cannot withstand the conditions necessary for effective steam pressure sterilization. In addition, steam pressure sterilization leaves the products wet so that extensive drying treatments are usually necessary before use of the product.

In accordance with the present invention it has been discovered that micro-organisms as well as their spores and by-products can be destroyed at lower temperatures and with shortened exposures to the high temperature conditions. This is accomplished by subjecting materials to be sterilized such as textiles, paper, cardboard, cork, etc., to heat in an atmosphere of the vapor of water or other volatile liquid under sufficiently low pressure to prevent condensation of liquid. That is, the temperature of the material is maintained at least as high as and preferably somewhat higher than the boiling point of the liquid at the pressure in the chamber so that no condensation of liquid takes place and the water or other vapor does not substantially dampen the materials being sterilized. Conversely stated the pressure is maintained at least as low as and preferably somewhat lower than the vapor pressure of the liquid at the temperature of the material during the sterilizing treatment. Under these conditions, the temperatures required for effective sterilization are sufficiently low and the time of treatment required is sufficiently short that no damage is caused to the majority of materials requiring sterilization.

It is therefore an object of the present invention to provide an improved process of sterilizing materials in which lower temperatures and shorter times of treatment are required for effective sterilization than in prior processes.

Another object of the invention is to provide an improved process of sterilizing materials in which the materials to be sterilized are subjected to elevated temperatures in an atmosphere of vapor of a volatile liquid under pressures sufficiently low to prevent substantial condensation of the liquid.

Another object of the invention is to provide a process of sterilizing materials in which such materials are subjected to elevated temperatures in the presence of water vapor under a sufficiently low pressure to prevent substantial condensation of moisture in or on the material.

A further object of the invention is to provide an improved process of sterilizing materials in which the materials to be sterilized are subjected to treatment with water vapor at a pressure below that at which substantial condensation of vapor occurs and at an elevated temperature and in which the heated materials are subjected to a relatively high vacuum prior to treatment with said water vapors.

A still further object of the invention is to provide an improved process of sterilizing materials in which the materials to be sterilized are subjected to treatment with water vapor at a pressure below that at which substantial condensation of vapor occurs and at an elevated temperature and in which the heated materials are subjected to a relatively high vacuum both prior and subsequent to said treatment with vapor.

The preferred steps in carrying out the present invention are to place the materials to be sterilized in a chamber which can be closed from the atmosphere so as to enable a partial vacuum to be produced therein. The contents of the chamber are then heated to the desired temperature, for example by passing hot air through the chamber or externally heating the walls of the chamber so that heat is imparted to the contents thereof, or the materials to be sterilized may be heated directly to the desired temperature by electric, gas, steam coils, or other heaters positioned in the sterilizing chamber. When the materials, including the micro-organisms, etc., carried thereby, have attained the desired temperature, air or other gases filling the chamber are withdrawn from the chamber to produce a partial vacuum. Steam is then introduced into the chamber until the absolute pressure has increased to the desired point, the desired pressure usually being considerably below the vapor pressure of water at the temperature of the material. In any event the pressure should not substantially exceed the vapor pressure of water at the temperature of the material and in many cases is below atmospheric pressure. The extent to which the pressure should be raised will depend upon the resistance of the micro-organisms, spores, or by-products to be destroyed and also, in some cases, upon the nature of the material being sterilized.

The temperature of the material in the chamber may decrease somewhat during removal of air or gases from the chamber and may again increase when steam is introduced into the chamber, depending upon the temperature of the steam supplied. These variations in temperature will, however, usually not be very great so that the materials are ordinarily maintained at substantially the same temperature during treatment in the sterilization chamber after they have once been brought to the desired temperature. After the exposure of the materials being sterilized to the atmosphere of water vapor at the sterilizing temperature has been continued for sufficient length of time to produce effective sterilization, the pressure in the chamber, if it differs from atmospheric pressure, may be allowed to come to atmospheric pressure by admission of air or release of vapor, and the chamber opened and the contents removed. In cases where the entrance of cool air may cause undesired condensation of moisture from the water vapor in the chamber at least a portion of the water vapor may be removed, for example by a vacuum pump to produce a relatively high vacuum before admitting air or the vapor may be forced from the chamber by introducing heated air. The further vacuum step just described also somewhat increases the sterilizing effect. It will be apparent that the conditions of sterilization above outlined may in many cases withdraw moisture from materials being sterilized, if they originally contained moisture, and in such cases cooling in the presence of the water vapor may be employed to restore such moisture, at least in part. The time and temperature of exposure usually necessary for sterilization is sometimes considerably less than that required in known sterilization processes and the materials are sensibly dry when withdrawn. Under these conditions no damage is caused to the usual materials being sterilized or, in any case, modification of such materials is much less than with prior sterilization processes.

The temperature to which materials must be heated during the sterilization process will depend primarily upon the type of micro-organisms or spores or by-products of the organisms which it is necessary to destroy. Thus, the vegetative cells of most types of bacteria, yeasts and molds are killed by exposing the same to temperatures of 180° to 200° F. in water vapor under a pressure of 5.0 to 15.0 inches of mercury absolute in a period of 10 to 25 minutes. The spores of ordinary soil and water bacteria, are more resistant to heat and require higher pressures and temperatures than many spores of other micro-organisms. Most of them are killed at temperatures between 200° and 225° F., at a pressure between 5 and 25 inches of mercury absolute. High resistance spores of some bacteria, such as the thermophiles, require temperatures between 225° and 275° F., at pressures between 5 and 25 inches of mercury. In each case above, the time of treatment will usually range between 10 and 30 minutes, although in some cases the time may be considerably less than 10 minutes. When sterilizing heat sensitive materials, it is also sometimes possible to use slightly lower temperatures and longer times of treatment, for example up to 60 minutes, although, in general, damage to materials being sterilized, as well as sterilizing efficiency, is a function of time and temperature so that high temperatures may be employed for short periods of time or lower temperatures for longer periods of time. In most cases there is a minimum temperature below which effective sterilization cannot be effected and a maximum temperature which cannot be exceeded without damage to the materials being sterilized. Thus, the temperatures in the process may range from approximately 180 to 300° F. under pressures ranging between approximately 5 to 135 inches of mercury absolute, although the pressure will rarely exceed 100 inches of mercury, and exposures may range between approximately 5 and 60 minutes.

In the practice of the present invention sterilization is thus carried out in water or other vapor and in the substantial absence of condensed liquid raher than by dry heat in the presence of air or heat in the presence of condensed moisture. At no time throughout the process does moisture collect on the materials being sterilized as distinguished from processes in which a cold product is introduced into a steam pressure autoclave and steam then introduced to heat the material. At the end of the sterilizing treatment the products are not moist and do not have to be dried. Many materials are not damaged by the sterilization treatment in accordance with the present invention although they are injured by the high temperatures required for sterilization by dry heat in the presence of air, or by the combined presence of moisture and heat in steam pressure sterilizing processes.

The present invention is particularly applicable to the sterilization of fabrics or fibrous materials such as cotton, gauze, bandages, swabs, etc., used in contact with open wounds. Also various other cotton cloths such as stained cotton, clothes, etc., are susceptible of sterilization by the present process. At the present time cotton or materials made from cotton such as gauze, etc., for therapeutical purposes are usually sterilized by the known steam pressure sterilization process and becomes wet during the sterilization treatment. This is injurious to the material and also requires that material be dried after sterilization. Injury to package material bearing labels, etc., is usually so great that another outside wrapper is added to avoid blurring of labels, etc. Such materials can, in accordance with the present invention, be sterilized in its original wrapper without injury to the ink, wrapper or the cotton. Also, low grade cotton called "stained cotton," which frequently carries bacteria and toxic by-products thereof causing respiratory diseases, can be sterilized by the present invention and the microbial growths and by-products destroyed without injury to the cotton.

As an example of the practice of the present invention, cotton, gauze, etc., either loose or in bales or in small packages can be placed in a sterilizing chamber and heated to the desired temperature. A vacuum is then drawn down to an absolute pressure of at most 5 inches of mercury and preferably to a lower pressure, for example .5 of an inch of mercury. Steam is then introduced, preferably at a temperature at least as high as or slightly higher than that to which the material was originally heated in the sterilizing chamber, to raise the pressure of the chamber to between 5 and 20 inches of mercury absolute. Most cotton fibers or fabrics can be safely heated to temperatures within a range of 225° to 275° F. with dry heat in the presence of air without injuring the materials although such treatment cannot be depended upon to produce sterilization. By removing the air, at least in part, according to the present invention and introducing a small amount of water vapor, the killing action upon the bacteria or other micro-organisms or the spores becomes complete. The higher the vapor pressure thus produced the more effective the killing action, but pressures exceeding the vapor pressure of the water at the temperature of the materials being treated will ordinarily impart deleterious moisture to the materials being sterilized. After a predetermined holding period, for example 5 to 25 minutes, depending upon the exact micro-organism or spore thereof which it is desired to destroy, the vacuum is released by admission of air and the products removed. Before the releasing of the vacuum it is sometimes desirable to again increase the vacuum in order to obtain the cooling effect of the vacuum and to insure that condensation of moisture does not take place when cool air is allowed to enter.

By the process just outlined cotton, woolen and other fabrics may thus be sterilized under temperatures which are not effective if dry heat is employed, while at the same time insufficient moisture is employed to add any substantial amount of moisture to the fabric or fibrous material. The materials come out of the sterilizing process in dry condition or with only a slight increase of moisture content even if a final high vacuum is not drawn and do not require further drying.

Where it is desired to destroy toxic by-products of microbial growth in the materials, it is sometimes necessary to employ somewhat higher temperatures and pressures than those just discussed. Thus temperatures as high as 300° F. may be necessary. Even if such higher temperatures are employed, cotton fabric or fibrous material may be treated without injury thereto by rapidly heating the materials to the higher temperature, then quickly withdrawing the air to produce an absolute pressure between .5 and 5 inches and preferably between .5 and 2.5 inches and introducing the steam as soon as the air has been largely removed from the treating chamber. Sufficient steam is introduced to develop an absolute pressure between approximately 5 and 50 inches of mercury depending upon the exact toxin which it is necessary to destroy and the time of exposure will also vary with the temperature employed and the type of toxin. In general, treatments between 10 and 25 minutes are usually sufficient.

The invention is also particularly applicable to the sterilization of corks and cork products, for example used bottle crowns. Cork inserts in the caps for carbonated beverages, beers, etc., consist essentially of shredded cork fabricated into a thin layer and bound together by means of a binder. Also, the tops of the crowns are usually covered with enamel or lacquer or other means for the protection of the printing or label. When the crowns are removed from bottles in cafes, soda fountains, bars, etc., there is ample opportunity for the crowns to become dirty and contaminated with bacteria, yeasts, or molds which cause spoilage of the beverage upon reuse of the crowns. Hertofore there has been no satisfactory process for the sterilization of used crowns and the reuse of crowns is especially important at the present time because of the shortage of satisfactory metal from which the new crowns can be fabricated.

It has been discovered that the cork liner or insert as well as the metal of the crown can be sterilized in accordance with the present invention without injury to the cork insert, the metal, or any lacquer, enamel or printing on the metal cap. For example, used crowns may be placed in trays, for example wire or wooden trays, or in bags or baskets or on a conveyor and placed inside of a sterilization chamber. The entire contents of the chamber are then heated to the desired temperature, for example by blowing hot air through the chamber or by heating the walls of the chamber or by use of gas, electric, steam coils, or other heaters positioned directly beneath the contents of the chamber. When the contents of the chamber are heated to approximately 200 to 225° F. the air is largely removed from the chamber to produce an absolute pressure of .5 to 2.5 inches of mercury. Water vapor in the form of steam is then introduced into the chamber until a pressure of from 4 to 19 inches absolute is produced. The contents of the chamber are held at approximately the temperatures and pressures above given for from 10 to 30 minutes depending upon the nature of the product. The chamber is then allowed to come to atmospheric pressure by admission of air, and the chamber opened and the products removed.

The temperatures of sterilization which are preferably employed in the present process for sterilizing bottle caps, namely 200 to 225° F., is not sufficiently high for adequate sterilization under the conditions of the dry heat sterilization process discussed above. Also the presence of condensed moisture at high temperatures deleteriously affects the cork inserts and printing, labels, etc. on the crowns in steam pressure sterilization. However, effective sterilization is produced by the present process. At no time throughout the process does any moisture condense on the product and at the end of the process the products are dry. Also under the conditions above given, the binder of the cork, any adhesive employed to fasten the cork insert in place, the cork itself, as well as the printing upon the outer surface of the crown, are not injured and the used crowns may be reused without danger of contamination of the beverages or other food products contained in bottles to which the covers are applied.

Thus the present invention provides an improved method of sterilization in an atmosphere of water or other vapor and at pressures which do not cause condensation of liquid from the vapor. The sterilization treatment is preferably carried out in the substantial absence of air but the presence of some air is not deleterious so long as a substantial amount of vapor is present. As stated above, it has been found that microorganisms as well as their spores may be killed by less drastic temperature conditions than those previously found necessary and in an atmosphere which does not damage the materials being sterilized or cause deposition of liquid in or upon such materials. The successive steps detailed above involving first heating the materials to be sterilized, then establishing a vacuum, introducing vapor, etc., all contribute to the sterilizing efficiency although substantially any series of steps which will subject the material to the vapor at an elevated temperature at a pressure which will not cause substantial condensation of the vapor at the temperature of the material may be employed with improved results over prior processes. Thus, it is possible with less efficiency to heat the materials, for example, by radiant heat, after establishing a vacuum or, alternatively, sufficient liquid may be introduced into the chamber after heating the material to provide the vapor atmosphere, particularly if the liquid is prevented from coming in contact with the materials being sterilized while in liquid form.

While water vapor is the preferred material constituting the vapor atmosphere during the sterilization treatment because of its cheapness, availability and excellent sterilizing effect, vapors of other volatile liquids having boiling points in the same general range as water, for example the lower aliphatic alcohols such as methyl, ethyl, isobutyl, etc., or certain of their esters with mineral or organic acids may be employed for sterilizing certain materials which are not damaged thereby and the same is true of various volatile liquid hydrocarbons, either aliphatic or aromatic, and other volatile liquid derivatives thereof, such as addition or substitution compounds, for example aldehydes, halogenated hydrocarbons, etc. Mixtures of various liquids may also be employed. In many cases it is particularly effective to add a small amount of another vapor or even a gas having a sterilizing effect to the water vapor. In any case the temperature of the material in the sterilizing chamber during the sterilizing treatment should be at least as high as and preferably higher than the boiling point of the liquid or mixture of liquids at the pressure in the chamber.

While I have disclosed the preferred embodiments of my invention, it is understood that the details thereof may be varied within the scope of the following claims.

I claim:

1. The method of sterilizing materials, which comprises the steps of, heating the materials to be sterilized to an elevated temperature in a substantially dry atmosphere, thereafter subjecting said materials while at said elevated temperature to an atmosphere containing a substantial amount of vapor of a volatile liquid for sufficient time to render said materials sterile, and maintaining the temperature of said materials sufficiently high and the pressure of said last mentioned atmosphere sufficiently low throughout the treatment of said materials with said vapor to prevent condensation of said vapor in contact with said materials.

2. The method of sterilizing materials, which comprises the steps of, heating the materials to be sterilized to a temperature between 180° and 300° F. in a substantially dry atmosphere, thereafter subjecting said materials while at said temperature to an atmosphere containing a substantial amount of water vapor for sufficient time to render said materials sterile, and maintaining the temperature of said materials sufficiently high and the pressure of said last mentioned atmosphere sufficiently low throughout the treatment of said materials with said vapor to prevent condensation of said vapor in contact with said materials.

3. The method of sterilizing materials, which comprises the steps of, heating the materials to be sterilized to a temperature between 180° and 300° F. in a substantially dry atmosphere, thereafter subjecting said materials while at said temperature to an atmosphere having an absolute pressure between 5 and 135 inches of mercury and containing a substantial amount of water vapor for sufficient time to render said materials sterile, and maintaining the temperature of said materials sufficiently high and the pressure of said last mentioned atmosphere sufficiently low throughout the treatment of said materials with said vapor to prevent condensation of said vapor in contact with said materials.

4. The method of sterilizing materials, which comprises the steps of, heating the materials to be sterilized to a temperature between 180° and 300° F. in a substantially dry atmosphere, thereafter subjecting said materials while at said temperature to an atmosphere containing a substantial amount of vapor of a volatile liquid and an absolute pressure between 5 and 135 inches of mercury for a time between 5 and 60 minutes and sufficient to render said materials sterile, and maintaining the temperature of said materials sufficiently high and the pressure of said last mentioned atmosphere sufficiently low throughout the treatment of said materials with said vapor to prevent condensation of said vapor in contact with said materials.

5. The method of sterilizing materials, which comprises the steps of, heating the materials to an elevated temperature in an atmosphere of substantially dry air, removing a major portion of the air from a sterilizing chamber containing said materials to produce an absolute pressure between approximately .5 and 5 inches of mercury, thereafter admitting a heated vapor of a volatile liquid to said chamber to produce an absolute pressure between approximately 5 and 135 inches of mercury, subjecting said materials to the resulting atmosphere of heated vapor at a temperature between approximately 180° and 300° F. for a time ranging between approximately 5 and 60 minutes, and maintaining the temperature of said materials sufficiently high and the pressure in said chamber sufficiently low throughout the treatment of said materials with said vapor to prevent condensation of vapors in contact with said materials.

6. The method of sterilizing materials, which comprises the steps of, heating the materials to an elevated temperature in an atmosphere of substantially dry air, removing a major portion of the air from a sterilizing chamber containing said materials to produce an absolute pressure between approximately .5 and 5 inches of mercury, thereafter admitting a heated vapor of a volatile liquid to said chamber to produce an absolute pressure between approximately 5 and 135 inches of mercury, subjecting said materials to the resulting atmosphere of heated vapor at a temperature between approximately 180° and 300° F. for a time ranging between approximately 5 and 60 minutes, and maintaining the temperature of said materials sufficiently high and the pressure in said chamber sufficiently low throughout the treatment of said materials with said vapor to prevent condensation of vapors in contact with said materials, thereafter reducing the pressure in said vacuum chamber by removing vapor therefrom and then admitting air to said sterilizing chamber.

7. A method of sterilizing materials consisting essentially of cotton, which comprises the steps of, heating said materials to a temperature between approximately 225° and 300° F. in a substantially dry atmosphere, thereafter subjecting said materials while at said temperature to an atmosphere containing a substantial amount of water vapor and at an absolute pressure between approximately 5 and 25 inches of mercury for a time between approximately 10 and 60 minutes, and maintaining the temperature of said materials sufficiently high and the pressure of said last mentioned atmosphere sufficiently low throughout the treatment of said materials with said vapor to prevent condensation of said vapor in contact with said materials.

8. The process of sterilizing bottle crowns formed of a metal cap having a cork insert of ground cork and a binder, which comprises the steps of, heating said crowns to a temperature between approximately 200° and 225° F. in a substantially dry atmosphere, thereafter subjecting said crowns while at said temperature to an atmosphere containing a substantial amount of water vapor at an absolute pressure between approximately 4 and 19 inches of mercury for a period of time between approximately 10 and 30 minutes, and maintaining the temperature of said crowns sufficiently high and the pressure of said last mentioned atmosphere sufficiently low throughout the treatment of said crowns with said vapor to prevent condensation of said vapor in contact with said crowns.

LAWRENCE H. JAMES.